US010757212B2

United States Patent
Keil et al.

(10) Patent No.: US 10,757,212 B2
(45) Date of Patent: Aug. 25, 2020

(54) METHODS AND SYSTEMS FOR SENDING PREPOPULATED MESSAGES TO A SELECTED GROUP OF MOBILE DEVICES

(71) Applicant: Life360, Inc., San Francisco, CA (US)

(72) Inventors: Dylan Keil, San Francisco, CA (US); Alexander Haro, San Francisco, CA (US)

(73) Assignee: Life360, Inc., San Francisco, CA (US)

( * ) Notice: Subject to any disclaimer, the term of this patent is extended or adjusted under 35 U.S.C. 154(b) by 92 days.

(21) Appl. No.: 16/036,479

(22) Filed: Jul. 16, 2018

(65) Prior Publication Data
US 2019/0335009 A1    Oct. 31, 2019

Related U.S. Application Data

(60) Provisional application No. 62/663,852, filed on Apr. 27, 2018.

(51) Int. Cl.
| | |
|---|---|
| G06F 15/16 | (2006.01) |
| H04L 29/08 | (2006.01) |
| H04L 12/58 | (2006.01) |
| H04W 4/029 | (2018.01) |
| H04W 4/021 | (2018.01) |

(52) U.S. Cl.
CPC .............. *H04L 67/26* (2013.01); *H04L 51/20* (2013.01); *H04L 51/38* (2013.01); *H04L 67/18* (2013.01); *H04W 4/021* (2013.01); *H04W 4/029* (2018.02)

(58) Field of Classification Search
CPC .......... H04L 51/20; H04L 51/38; H04L 67/18; H04L 67/26; H04W 4/021; H04W 4/029
See application file for complete search history.

(56) References Cited

U.S. PATENT DOCUMENTS

| 8,832,301 | B2 * | 9/2014 | Graff | ............... G06Q 10/1093 |
| | | | | 709/231 |
| 8,983,497 | B2 * | 3/2015 | Ziskind | ............... H04W 4/21 |
| | | | | 455/456.2 |
| 9,294,429 | B2 * | 3/2016 | Hahm | ............... H04W 4/21 |
| 9,301,095 | B2 * | 3/2016 | Haro | ............... H04W 4/029 |
| 9,788,163 | B2 | 10/2017 | Haro et al. | |
| 10,084,798 | B2 * | 9/2018 | Looney | ............... H04L 63/10 |
| 10,129,211 | B2 * | 11/2018 | Heath | ............... H04L 63/00 |
| 10,251,128 | B2 * | 4/2019 | Nguyen | ............... H04W 52/0229 |
| 10,348,819 | B2 * | 7/2019 | Chadaga | ............... G06T 11/001 |
| 2002/0111845 | A1 * | 8/2002 | Chong | ............... G06Q 10/109 |
| | | | | 705/7.13 |
| 2004/0193716 | A1 | 9/2004 | McConnell | |

(Continued)

*Primary Examiner* — Moustafa M Meky
*Assistant Examiner* — Thorne E Waugh
(74) *Attorney, Agent, or Firm* — Womble Bond Dickinson (US) LLP (57) ABSTRACT

Methods and systems for delivering a prepopulated message to a subgroup of registered mobile devices are disclosed. In one embodiment, a tracking server is registered and linked with to track a location of a first mobile device. A first subgroup of mobile devices that are within a predefined radius of the location of the first mobile device is created. Contextual data that is selected by a user of the first mobile device is received. A message is prepopulated based on the received contextual data, where the prepopulated message includes a context of a meeting. The prepopulated message is sent to each mobile device in the first subgroup of mobile devices.

19 Claims, 8 Drawing Sheets

(56) References Cited

U.S. PATENT DOCUMENTS

| | | | |
|---|---|---|---|
| 2007/0202844 A1* | 8/2007 | Wilson | H04W 64/00 |
| | | | 455/404.2 |
| 2008/0132251 A1* | 6/2008 | Altman | G06Q 30/0269 |
| | | | 455/457 |
| 2010/0100413 A1* | 4/2010 | O'Sullivan | G06Q 10/02 |
| | | | 705/7.18 |
| 2010/0332326 A1* | 12/2010 | Ishai | H04W 4/185 |
| | | | 705/14.58 |
| 2011/0099142 A1* | 4/2011 | Karjalainen | H04L 67/12 |
| | | | 707/600 |
| 2012/0161971 A1* | 6/2012 | Nasir | G07C 1/10 |
| | | | 340/573.4 |
| 2013/0337860 A1 | 12/2013 | Xu et al. | |
| 2014/0024400 A1 | 1/2014 | Kang et al. | |
| 2014/0045475 A1 | 2/2014 | Anthony, Jr. et al. | |
| 2014/0244765 A1* | 8/2014 | Smith | H04L 51/046 |
| | | | 709/206 |
| 2014/0274157 A1* | 9/2014 | Frank | H04M 3/4878 |
| | | | 455/456.3 |
| 2015/0018019 A1 | 1/2015 | Haro et al. | |
| 2016/0057020 A1 | 2/2016 | Halmstad et al. | |
| 2016/0105768 A1 | 4/2016 | Pinard et al. | |
| 2016/0205517 A1 | 7/2016 | Luo et al. | |
| 2016/0323233 A1* | 11/2016 | Song | G08G 1/0141 |
| 2018/0077542 A1* | 3/2018 | Xie | G06Q 10/10 |

\* cited by examiner

METHODS AND SYSTEMS FOR SENDING PREPOPULATED MESSAGES TO A SELECTED GROUP OF MOBILE DEVICES

CROSS REFERENCE TO RELATED APPLICATIONS

This application claims the benefit of U.S. Provisional Application No. 62/663,852 filed on Apr. 27, 2018, the disclosure of which is incorporated herein by reference.

FIELD OF THE INVENTION

Embodiments of the present disclosure relate generally to methods and systems for group interactions. More particularly, embodiments of the disclosure relate to methods and systems for sending prepopulated messages to a selected group of mobile devices.

BACKGROUND

Identifying locations of mobile devices has become a necessity in many applications, such as geofencing, geolocation, mobile tracking and personal identification, and enablement and enhancement of personal and group interactions. Today, global positioning systems (GPSs) that use satellites and cell towers (e.g., triangulation method) for location (or position) fixing of mobile devices, for example smartphones, tablets, laptops, wearable devices, and the like, have become more common with the widespread of mobile devices and wireless connectivity. Moreover, in the past years, location identification capabilities have also improved. Conventional location fixing methods generally use geo-positioning satellites or triangulation using local wireless towers and various fixed sensors to identify and fix the location of a mobile device. However, the position accuracy of the conventional location fixing methods is typically inaccurate due to inaccuracies of the sensors and/or reflections from the mobile device's surroundings (e.g., neighboring geographical and manmade structures). Such inaccuracies and reflections generally cause an identified location to bounce around in a very haphazard way.

Moreover, some of the applications running on the mobile device triangulate the mobile device's location on the Earth's surface. These applications access the mobile device's position to provide services including sending messages, for example using short message service (SMS), to a selected group of mobile devices. Conventionally, however, to send a message with such applications, a user of the mobile device must manually type the message. Further, the user is required to identify a group or subgroup of individuals to whom the message is directed. These tasks, therefore, would consume time and effort from the user of the mobile device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment", "an embodiment", or "some embodiments" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a group of mobile devices are registered and enabled for tracking of the locations of the group of mobile devices by a tracking server. The tracking server identifies the locations of the tracked mobile devices using, for example, the method and apparatus of U.S. Pat. No. 9,788,163, entitled "Apparatus and method for increasing accuracy of location determination of mobile devices within a location-based group", the disclosure of which is incorporated herein by reference. The tracked group of mobile devices may include subgroups that are defined differently, such as a family subgroup, extended family subgroup, friends subgroup, friends and family subgroup, college friends subgroup, sport and club subgroup, etc. These subgroups may include common members or different members from one another.

According to one embodiment, a tracking server is registered and linked with to track a location of a first mobile device. A first subgroup of mobile devices that are within a predefined radius of the location of the first mobile device is created. Contextual data that is selected by a user of the first mobile device is received. A message is prepopulated based on the received contextual data, where the prepopulated message includes a context of a meeting. The prepopulated message is sent to each mobile device in the first subgroup of mobile devices.

In one embodiment, to create the first subgroup of mobile devices, a subgroup of mobile devices that are located within a proximity sensitivity radius from the location of the first mobile device is searched and defined based on a subgroup criterion. In another embodiment, to send the prepopulated message to each mobile device in the first subgroup of mobile devices, a request to transmit a push notification is sent to the tracking server, where the push notification includes the prepopulated message.

In still another embodiment, a second subgroup of mobile devices that are within the predefined radius of the location of the first mobile device is created. The second subgroup of mobile devices includes at least one common mobile device with the first subgroup of mobile devices, and at least one mobile device excluded from the first subgroup of mobile devices. In yet another embodiment, to send the prepopulated message to each mobile device in the first subgroup of mobile devices, the prepopulated message is sent to the at least one common mobile device with the second subgroup of mobile devices, and the prepopulated message fails to send to the at least one mobile device excluded from the first subgroup of mobile devices.

Figure 1:
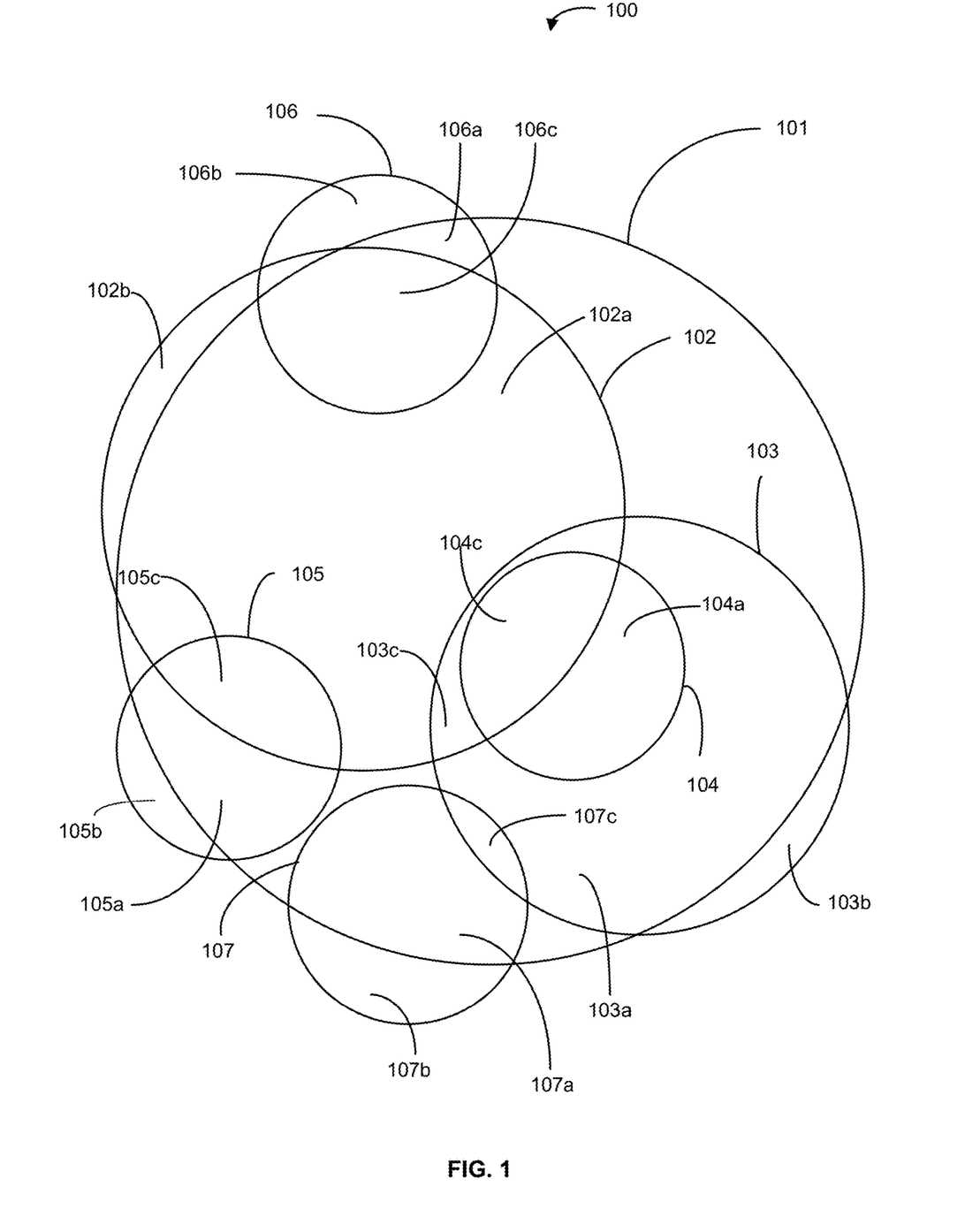
FIG. 1 is a diagram illustrating relationships among subgroups within a group of mobile devices according to one embodiment.

FIG. 1 is a diagram illustrating relationships among subgroups within a group of mobile devices according to one embodiment. Referring to FIG. 1, system 100 may include a group 101 of mobile devices (as represented by a large circle for illustration purposes). Group 101 may include all mobile devices registered and linked with a tracking server that tracks their locations. The mobile devices may be portable computers such as laptop, notebook, tablet, and handheld computers or may also take the form of other types of devices, such as smartphones, media players, personal data organizers, handheld game platforms, cameras, wearable devices (e.g., smartwatch) and/or combinations of such devices. In one embodiment, group 101 may include the mobile devices that are members of a social networking group that are being tracked by their locations. For instance, the membership to these social networks include registration with one or more central servers as part of different subgroups, such as family subgroup, friends subgroup, extended family and friends subgroup, college friends subgroup, sport and club subgroup, etc.

Accordingly, in FIG. 1 group 101, for example, may include extended family subgroup 103 (as represented by a smaller circle as compared to group 101). In subgroup 103, mobile devices that are within subgroup portion 103a are part of group 101, while mobile devices that are within subgroup portion 103b are excluded from group 101. Thus, the mobile devices in subgroup portion 103b are not being tracked by the tracking server. As further illustrated in FIG. 1, extended family subgroup 103 may include a family subgroup 104. In addition, group 101 may also include neighborhood subgroup 102, classmates subgroup 105, coworkers subgroup 106, and other acquaintances subgroup 107. Each of these subgroups may include mobile devices that are not registered with group 101, for example mobile devices in subgroup portions 102b, 105b, 106b, and 107b respectively. Therefore, locations of such mobile devices are not being tracked by the tracking server.

On the other hand, each of the subgroups 102, 105, 106, and 107 may include mobile devices that are registered with group 101, such as mobile devices in subgroup portions 102a, 105a, 106a, and 107a respectively. Thus, the locations of these mobile devices are tracked by the tracking server. In addition, each of subgroups 102, 105, 106, and 107 may include common mobile devices with other subgroups, as shown in subgroup portions 102c, 104c, 105c, 106c and 107c for example.

Figure 2:
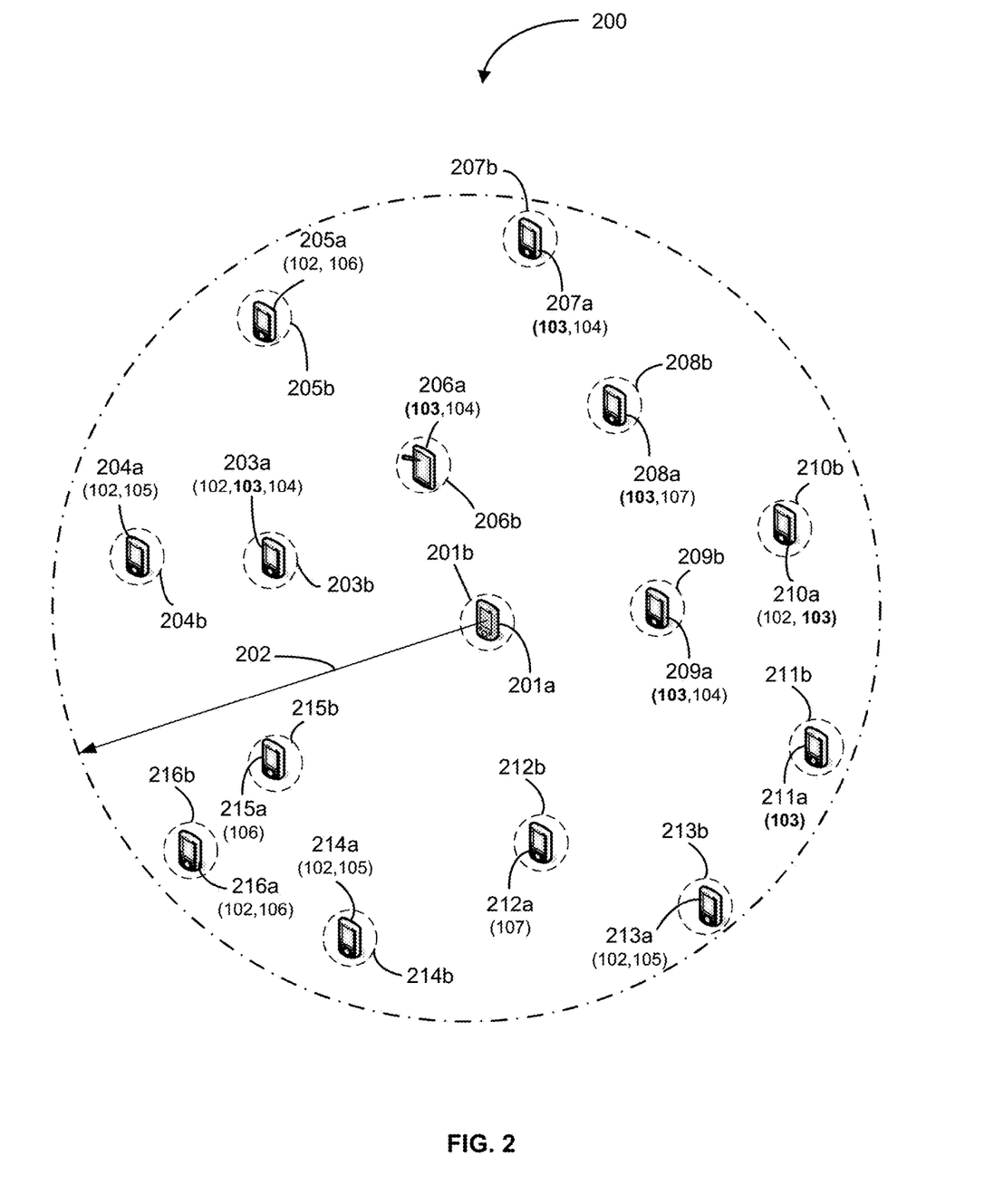
FIG. 2 is a diagram illustrating a system including a group of mobile devices according to one embodiment.

FIG. 2 is a diagram illustrating a system including a group of mobile devices according to one embodiment. Referring to FIG. 2, system 200 includes a group of mobile devices 201a and 203a-216a having respective locations 201b and 203b-216b that are tracked by a tracking server. As shown, locations 203b-216b may be within a predefined distance (or radius) 202 from location 201b of mobile device 201a. In one embodiment, mobile devices 203a-216a may belong to one or more subgroups as previously described. For example, mobile devices 203a and 206a-210a may be identified as members of extended family subgroup 103 (as shown in bolded font in parentheses) within the predefined distance 202 from mobile device 201a. Such identification may enable a user (e.g., user of mobile device 201a) to select a subgroup (e.g. neighborhood subgroup 102, extended family subgroup 103, family subgroup 104, classmates subgroup 105, coworkers subgroup 106, other acquaintances subgroup 107, or a combination of such subgroups) for contact and messaging. In one embodiment, the messaging may be directed or sent to the selected subgroup that is within predefined distance 202 (e.g., mobile devices in subgroup portions 102a, 105a, 106a, or 107a) from the message originator (e.g., user of mobile device 201a). In another embodiment, the messaging may also be sent to a subgroup of mobile devices that is outside of the predefined distance 202 (e.g., mobile devices in subgroup portions 102b, 105b, 106b, or 107b) from the message originator, such as to inform the users within the subgroup of the message originator's inability to meet due to time and/or distance limitations.

In some embodiments, although the above-described capability exists for selection of any of the registered subgroups for contact, the emphasis is to identify locations of individuals in the registered group (e.g., group 101 of FIG. 1), such as immediate family members, friends, or relatives (e.g., extended family members), and facilitate safe interactions among the individuals (or group members). As an example, the contact and messaging capability (as previously described) may enable a member at location 201b to plan an activity or a meeting (e.g., breakfast, lunch, dinner, movies, etc.) with one or more members of extended family subgroup 103. That is, available members of subgroup 103 (e.g., some or all users of mobile devices 203a and 206a-210a) within the predefined distance 202 may be informed of or invited to the planned activity, for example the activity is taking place with members in their neighborhood. In one embodiment, a user of the registered group (e.g., user of mobile device 201a) may create any type of subgroups using for example an application program (also referred to as "app") installed on the user's mobile device. The subgroups for example may be labelled with any labels, such as "caregivers", "extended family", "golf buddies", or "John's baseball team", as long as individual group affiliations of the subgroup members are known. That is, the mobile devices associated with the subgroup members are registered with the registered group (e.g., group 101 of FIG. 1).

In one embodiment, a user's location (e.g., location 201b) and contacts are only visible to users of mobile devices that are in a specific subgroup (e.g., subgroup 103). In one embodiment, mobile devices that are in different subgroups are not visible to one another unless one subgroup is within another subgroup. For example, referring back to FIG. 1, locations of mobile devices in neighborhood subgroup 102 may not be visible to mobile devices in extended family subgroup 103, and vice versa in some embodiments, since locations of mobile devices in subgroup 102 are external to subgroup 103. On the other hand, locations of mobile devices in family subgroup 104 may be visible to mobile devices in subgroup 103, and vice versa in some embodiments, as locations of mobile devices in subgroup 104 are within subgroup 103. In another embodiment, common mobile devices between a pair of subgroups may be visible to one another. For instance, locations of mobile devices within subgroup portion 102c, 104c, 105c, 106c or 107c may be visible to the mobile devices within such subgroup portion.

In one embodiment, in order to enhance the user experience of sending messages from one mobile device to another, embodiments of the disclosure may provide prepopulated messages that are delivered via a notification service. Such notification service generally sends a notification (or notice) to different users of mobile devices at once, and does not require a response. In one embodiment, the notification may be delivered (or broadcasted) by e-mail, telephone, fax, text messages, push notification, etc. With continued reference to FIG. 2, the prepopulated message may be generated and sent based on contextual data, location data of mobile device 201a, and proximity information of the mobile device 201a. In one embodiment, the proximity information may include an identification of mobile devices that are within predefined distance 202 (or a proximity sensitivity radius) of mobile device 201a. The predefined distance 202, for example, may be selected by the user of mobile device 201a via an application program (or app).

In one embodiment, contextual data may include activities (e.g., breakfast, lunch, dinner, night out, happy hour, movies, etc.), events (e.g., birthday, anniversary, etc.), point of interest (POI) such as restaurants, airports, parks, amusement parks and rides, historic sites, etc. For example, using the application program, a user of mobile device 201a may select, for example via drop-down lists with predefined values or options, a particular activity, a particular event, a POI, a meeting time, a meeting location, etc. Based on this contextual data, a prepopulated message is automatically formulated or generated to include the selected information from the user. The prepopulated message may include context of a meeting, a status of the meeting, an identity of the users at the meeting, time of the meeting, location of the meeting, or any other relevant details. In other words, instead of writing a message for a birthday celebration, an evening gathering for drinks, or a dinner with friends, for example, a user may select predefined options from a number of drop-down lists of the application program to automatically populate the message. This way, manual typing of the message by the user can be avoided, thereby expediting the messaging process and enhancing the group interaction experience for the user.

Moreover, embodiments of the disclosure may be utilized in various applications. For example, an arrival of a child at a destination (e.g., a school), or crossing a street may trigger an automatic alert (e.g., a push notification) to be sent to parents of the child. As another example, consider a group of friends, when a member of the group visits a new location or arranges a meeting with a friend at a location, the user is able to select the group to which the prepopulated message is directed. The user may also select a location for the meeting, and inform other members of the group of the location. Accordingly, the information is delivered to the members of the group that meet the criteria set for receiving the message (e.g., the locations of the members are within a predetermined distance from the user). As a further example, consider the city of San Francisco where a member setting up a meeting can select a subgroup, such classmates, who are currently within five miles radius of Embarcadero station or a specific chosen restaurant, to be sent intimation of the meeting. Accordingly, a prepopulated message may be generated and sent to all members in the meeting (e.g., as a push notification) that meet a set criteria to receive the message.

In some embodiments, registration with the tracking server may include an automatic (or default) opting-in option for push notifications from all users (or members) of mobile devices in group 101. In some embodiments, users of mobile devices in a subgroup are also given an option to opt-in or opt-out of push notification. This option may be provided by the application program to enhance its acceptability.

In order to facilitate user interactions, in one embodiment, a push notification may be utilized to deliver a prepopulated message (as previously described) from mobile device 201a, instead of a text message. The text message and push notification are generally similar in nature. They both arrive on a user's mobile device, fit within character limits, and have average open rates. However, users may be charged for each text message they send while a notification is generally free of charge. In addition, the opting-in/opting-out dynamic also favors a push notification as a user has control over the reception of such notification. That is, a user generally has full control over which application programs (or apps) are allowed to send them push notifications. Moreover, the user may even specify which types of push notifications they opt for, and therefore, will receive from each application program. Furthermore, a text message often comes unsolicited and is difficult to filter. Because of the sale of phone number lists, there is a proliferation of spam texts, and text messaging (e.g., SMS) is therefore viewed as a lower level channel of communication.

In order to allow a prepopulated message to be generated and sent as a push notification to mobile devices in a subgroup, the tracking server, with which the mobile devices are registered, may register with an operating system push notification service (OSPNS) or a generic push notification service that spans multiple OSPNS. The push notification service may provide an application programming interface (API) to the tracking server. Using the provided API and a software development kit, the tracking server may generate and provide an application program for download by the mobile devices (e.g., through a web service).

Users of the mobile devices in the group may download the application program onto their mobile devices (e.g., through the web service). The application program may include the prepopulated message generation capability, and the ability to use a uniform resource identifier (URI) and allow the registered mobile devices to opt-in or opt-out for reception of push notifications from other mobile devices in the group. In one embodiment, a user of a mobile device in the group (e.g., mobile device 201a) is also able to identify mobile devices in a subgroup that are within an area covered by predetermined distance 202.

Figure 3:
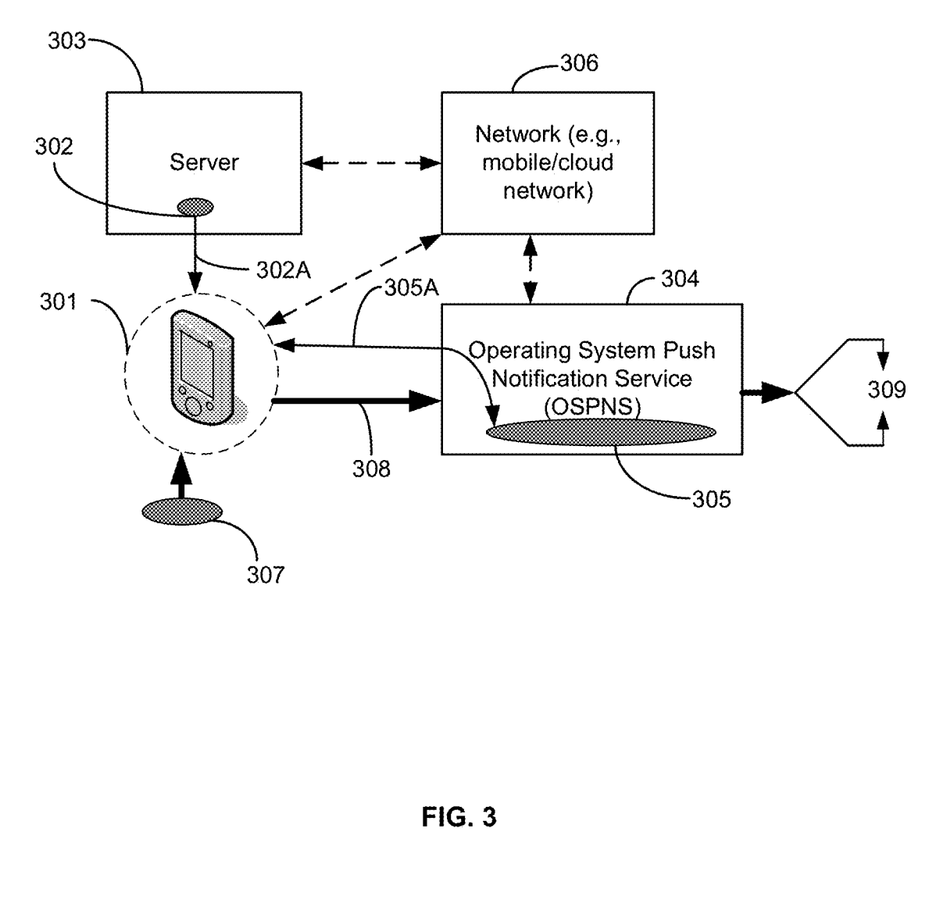
FIG. 3 is block diagram illustrating a system for delivering a notification to a mobile device according to one embodiment.

FIG. 3 is block diagram illustrating a system for delivering a notification to a mobile device according to one embodiment. Referring to FIG. 3, the system may include a mobile device 301, server 303, and operating system push notification service (OSPNS) 304 that may be communicatively coupled to one another over a network 306. Mobile device 301 may be any of the mobile devices shown in FIG. 2. Mobile device 301 may be portable computers such as laptop, notebook, tablet, and handheld computers or may also take the form of other types of devices, such as smartphones, media players, personal data organizers, handheld game platforms, cameras, wearable devices (e.g., smartwatch) and/or combinations of such devices. Network 306 may be any type of networks such as a local area network (LAN), a wide area network (WAN) such as the Internet, a cellular network, a satellite network, mobile or cloud network, or a combination thereof, wired or wireless. Server 303 may be any kind of servers or a cluster of servers, such as Web or cloud servers, tracking servers, application servers, backend servers, or a combination thereof.

With continued reference to FIG. 3, mobile device 301 (which may be a notification client) may download an application program 302 from server 303 via download link 302A. The mobile device 301 may request and receive URI 305 and a registration identifier (ID) token from OSPNS 304 via link 305A. In one embodiment, mobile device 301 may search and identify locations of mobile devices that are configured to receive push notifications. Using the downloaded application program 302 and network 306 (e.g., cloud network), mobile device 301 may be able to access URI 305, generate and authenticate a push notification 307, and send a request to transmit the push notification 307. In one embodiment, to send the request to transmit the push notification 307, mobile device 301 may broadcast the request, via broadcast channel 308, to OSPNS 304. OSPNS 304 may then deliver the push notification 307 to a selected subgroup of mobile devices 309 (e.g., mobile devices 203a, 206a-210a, 215a of FIG. 2) with users who have opted to receive push notifications. In one embodiment, prior to delivering push notification 307, OSPNS 304 may verify and authenticate the push notification 307. In one embodiment, the push notification 307 may be a prepopulated message that includes details about a meeting, such as context of the meeting, a status of the meeting, the identity of the users of the selected subgroup of mobile devices 309 at the meeting, a time of the meeting, a location of the meeting, and/or any other relevant information as pertained to the meeting, where the details are formulated based on selected contextual data. The selected contextual data may include activities (e.g., breakfast, lunch, dinner, night out, happy hour, movies, etc.), events (e.g., birthday, anniversary, etc.), a POI (e.g., restaurants, airports, parks, amusement parks and rides, historic sites, etc.), the time of the meeting, the location of the meeting, or any other relevant details. The push notification 307 may be visible to the users of the subgroup of mobile devices if the users elect or opt to receive push notifications. As an example, a notification regarding the location of an individual visiting Market Street in San Francisco may be sent to the friends of the individual in that vicinity, such as staying or working around Market Street, in order to organize a meeting among the individual and his/her friends. This may require identification of the locations of the individual and the friends, and sending the notification to the friends' mobile devices.

Figure 4:
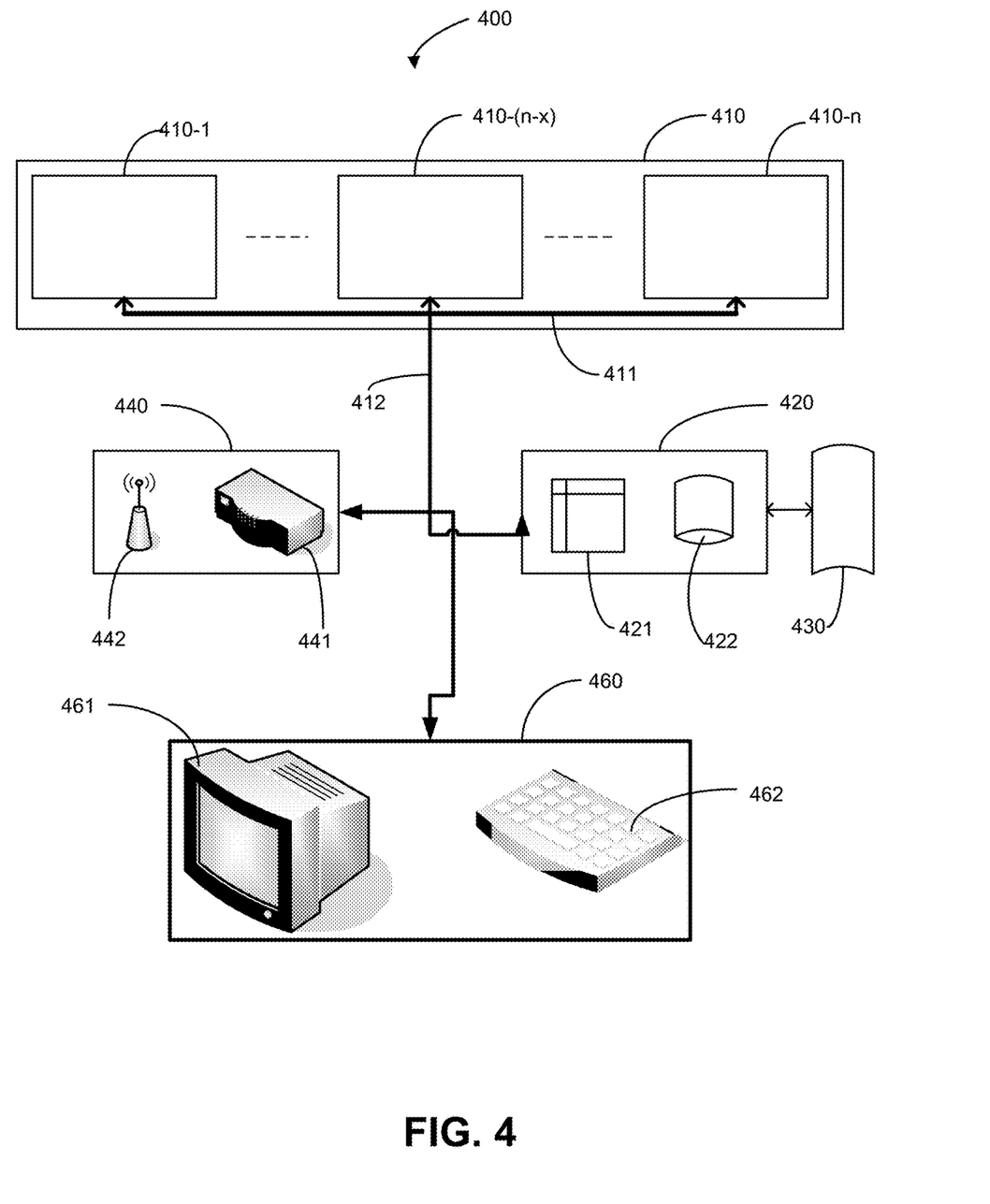
FIG. 4 is a block diagram illustrating an example of a data processing system which may be used with one embodiment.

FIG. 4 is a block diagram illustrating an example of a data processing system which may be used with one embodiment. For example, system 400 may represent any of data processing systems described above performing any of the processes or methods described below, such as, for example, server 303. Referring to FIG. 4, system 400 may include one or more processing cores 410-1 to 410-n (collectively as processor 410), memory 420, communication interface 440, and input/output (IO) devices 460 connected (or coupled) via a bus or interconnect 412. As shown, processing cores 410-1 to 410-n may be connected to one another via bus or interconnect 411. In one embodiment, IO devices 460 may include display device 461 and input device 462 (e.g., a keyboard, mouse, etc.).

In one embodiment, communication interface 440 may be a network communication interface that includes a wired network interface 441 (e.g., an IEEE 802.3 Ethernet) and a wireless network interface 442 (e.g., an IEEE 802.11 WiFi interface, cellular networking interface). Communication interface 440 may transmit and receive data in accordance with a communication protocol, such as Global System for Mobile communications (GSM), code division multiple access (CDMA), current 2G, 3G, 4G, long term evolution (LTE), or an IEEE 802.11 network, for example WiFi or wireless local area network (WLAN).

In one embodiment, communication interface 440 may receive location data and proximity information from each of the group of registered mobile devices 101, and display the location data and proximity information on display device 461. The location data received from mobile device 201a (or mobile device 301), for example, may include location 201b (i.e., the location in which mobile device 301 is located). The proximity information received from mobile device 301 may include an identification of the locations of mobile devices that fall within predefined distance 202 from location 201b of mobile device 201a. For instance, mobile device 201a may provide an identification of mobile devices 203a-216a that are within a proximity sensitivity radius (or predefined distance) 202 of mobile device 201a, from which mobile devices 203a, 206a-210a and 215a are part of a selected subgroup of mobile devices that is identified for contact. The communication interface 440 may also transmit a refined location of mobile devices received from processor 410 to the display device 461 for display.

In one embodiment, processor 410 may include a microprocessor, a microcontroller, a digital signal processor, a central processing unit (CPU), or any other integrated circuits, such as glue logic. The term "processor" is referred to as a device having two or more processing units or elements, for example, a CPU with multiple processing cores 410-1 to 410-n. The processor 410 may be used to control the operations of the communication interface 440. For example, the processor 410 may be coupled to the communication interface 440 and executes software to control the wireless network communications functionality of a user's server (e.g., communicating with a network to transmit and receive data to and from other components of the system). In some cases, a particular function may be implemented as two or more pieces of software running on interconnected hardware, that is, the instructions are executed by different hardware units of the processor 410.

In one embodiment, the processor 410 is coupled to memory 420 that may include a volatile storage (or memory) device 421, such as random access memory (RAM), dynamic RAM (DRAM), synchronous DRAM (SDRAM), static RAM (SRAM), or other types of storage devices. In one embodiment, memory 420 may further include a non-volatile storage (or memory) 422, such as hard disk drive (HDD), solid state device (SSD), a hard disk drive with a smaller amount of SSD storage to act as a SSD cache to enable non-volatile storage of context state and other such information during power down events so that a fast power up can occur on re-initiation of system activities, or a flash drive. In one embodiment, memory 420 may include (or may be coupled to) a database 430 that stores location data associated with the mobile devices tracked by a tracking server (e.g., server 303). The database 430 may also store membership or registration data in explicit or implicit groups, member or mobile device characteristics, location identification, other location related information, historical subgroup member data, and location-based subgroup data. The memory 420 may also store instructions (e.g. software, firmware) which may be executed by the processor 410. In one embodiment, when the instructions stored in memory 420 are executed by the processor 410, the processor 410 performs methods for increasing accuracy of a location determination of mobile devices within any registered location-based subgroup.

In addition, various other peripheral units (not shown) may be connected or coupled to system 400 to form a computer platform including, but is not limited to, a mouse, additional data storage units, printing units and/or other types of IO units. The processor 410, memory 420, and communication interface 440 may communicate to input devices and output devices via one or more communication links, such as interconnect 412. The communication links may also be other wired or wireless communication links. Though a single system is discussed, it is understood that the system 400 may be a virtual machine, with all the above capabilities, distributed over multiple servers locally or remotely (e.g., in a cloud service).

Embodiments of the invention herein below may be described as a process, which may be depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a procedure, or the like.

Figure 5:
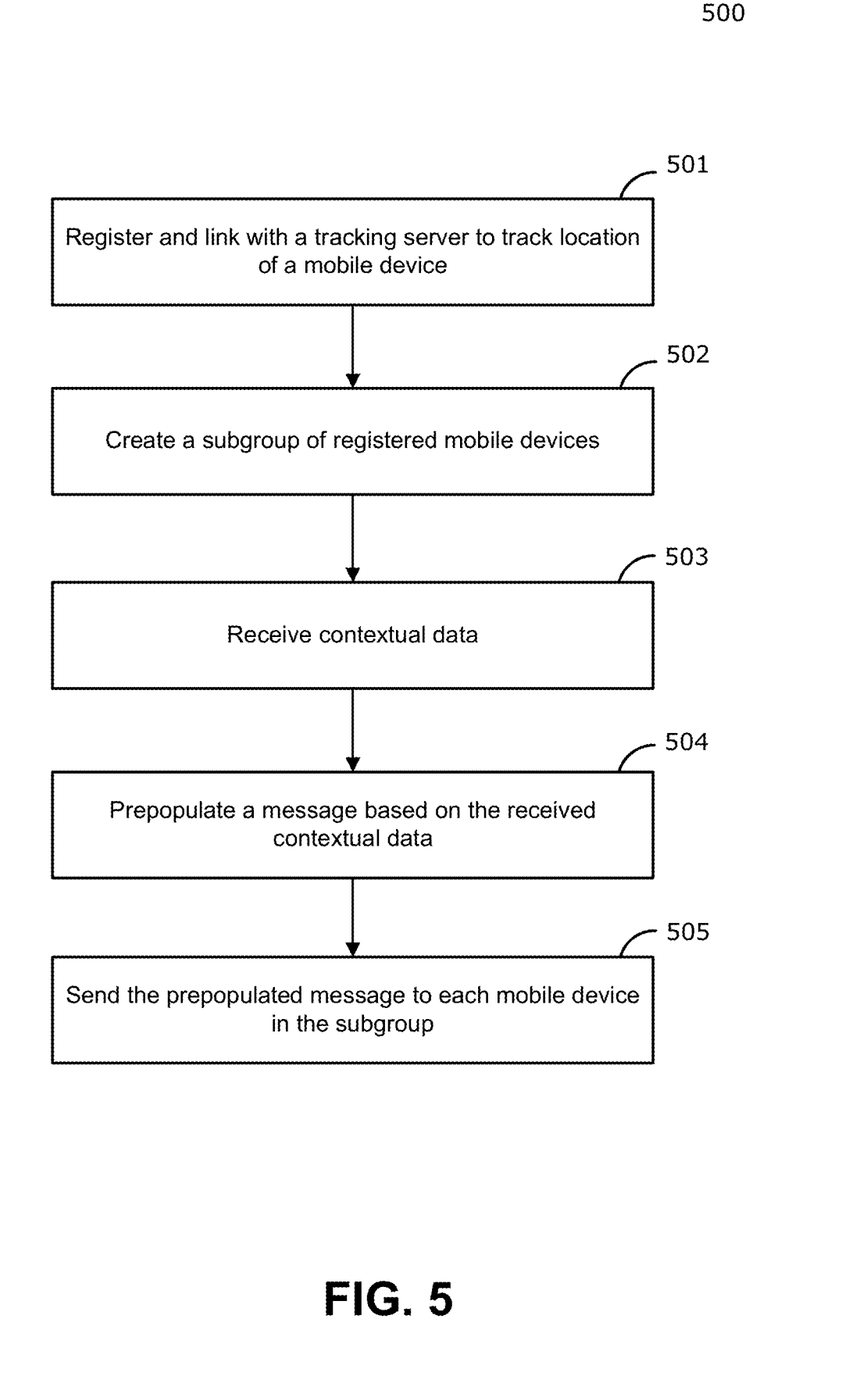
FIG. 5 is a flow diagram illustrating a method of prepopulating and sending a message according to one embodiment.

FIG. 5 is a flow diagram illustrating a method of prepopulating and sending a message according to one embodiment. Process 500 may be performed by processing logic which may include software, hardware, or a combination thereof. For example, process 500 may be performed by one or more mobile devices (e.g., mobile devices 201*a*, 203*a*-216*a* of FIG. 2, or mobile device 301 of FIG. 3).

Referring to FIG. 5, at block 501, the mobile device is registered and linked with a tracking server (e.g., server 303) to track the mobile device's location. At block 502, the mobile device creates a first subgroup of registered mobile devices. For example, the mobile device may search and define a subgroup of registered mobile devices that are located within a predefined distance (or a proximity sensitivity radius) from the mobile device. In one embodiment, the creation of the first subgroup may be based on a subgroup criterion, such as, for example neighborhood subgroup 102, extended family subgroup 103, family subgroup 104, classmates subgroup 105, coworkers subgroup 106, or other acquaintances subgroup 107. In one embodiment, the subgroup criterion is previously identified by the tracking server. In one embodiment, the predefined distance may be selectable by a user of the mobile device. In one embodiment, the mobile device may create a second subgroup of mobile devices that are located within the predefined distance from the mobile device. In one embodiment, the second subgroup may include one or more common mobile devices with the first subgroup, and one or more mobile devices that are excluded from the first subgroup.

At block 503, the mobile device receives contextual data, for example, from a user of the mobile device. As previously described, the user may select the contextual data using, for example, drop-down lists with predefined values or options. The contextual data may include activities (e.g., breakfast, lunch, dinner, night out, happy hour, movies, etc.), events (e.g., birthday, anniversary, etc.), POI (e.g., restaurants, airports, parks, amusement parks and rides, historic sites, etc.), time of a meeting, location of the meeting, or any other relevant details. At block 504, based on the received contextual data, the mobile device may prepopulate a message. For instance, using the received contextual data, the mobile device may automatically formulate or generate the message to include context of a meeting, a status of a meeting, identity of the users of the first subgroup of mobile devices at the meeting, a time of the meeting, and/or a location of the meeting. In other words, instead of writing a message (e.g., manual typing) for a birthday celebration, an evening gathering for drinks, or a dinner with friends, for example, a user may select predefined options from a number of drop-down lists of the application program to automatically populate the message. This way, manual typing of the message by the user can be avoided, thereby expediting the messaging process and enhancing the group interaction experience for the user.

At block 505, the mobile device sends the prepopulated message to each mobile device in the first subgroup. For example, the mobile device may generate and send the prepopulated message as a notification (e.g., push notification) to each mobile device in the first subgroup that is within the predefined distance (or proximity sensitivity radius) from the mobile device. In doing so, the mobile device may send a request to transmit the notification to the tracking server. The tracking server may then send the notification (i.e., prepopulated message) to a notification service (e.g., OSPNS 304), which delivers the notification to respective mobile devices in the first subgroup. Alternatively, in one embodiment, the mobile device may send the request to transmit the notification to the notification service, which then delivers the notification to the respective mobile devices in the first subgroup. As previously described, the notification is sent to mobile devices that are opted or elected to receive notifications. In one embodiment, in sending the prepopulated message to each mobile device in the first subgroup, the mobile device may send the prepopulated message to the common mobile devices with the second subgroup. However, in this embodiment, the mobile device may fail to send the prepopulated message to mobile devices that are excluded from the first subgroup. In another embodiment, the mobile device may send the prepopulated message to the excluded mobile devices, for example, to inform the users of the excluded mobile devices of the message originator's inability to meet due to time and/or distance limitations.

Figure 6:
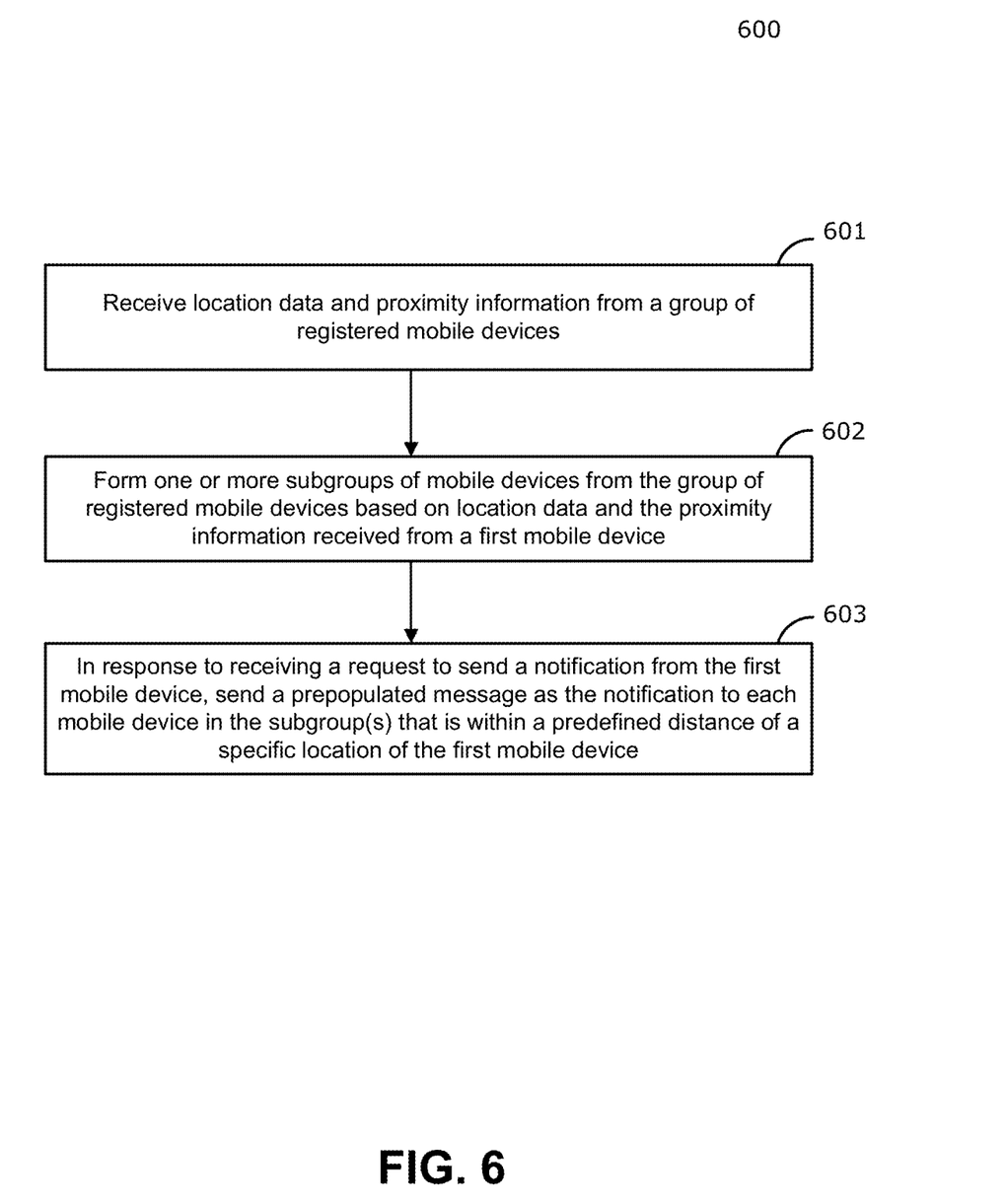
FIG. 6 is a flow diagram illustrating a method of delivering a notification to a mobile device according to one embodiment.

FIG. 6 is a flow diagram illustrating a method of delivering a notification to a mobile device according to one embodiment. Process 600 may be performed by processing logic which may include software, hardware, or a combination thereof. For example, process 600 may be performed by a server (e.g., server 303 of FIG. 3).

Referring to FIG. 6, at block 601, the server may receive location data and proximity information from each of a group of registered mobile devices (e.g., group 101), respectively. At block 602, the server may form one or more subgroups of mobile devices from the group of mobile devices based on location data and proximity information received from a first mobile device (e.g., mobile device 201*a*). For instance, the server may receive the location data and proximity information from communication interface 440, identify a specific location of the first mobile device based on the location data and the proximity information, and form a subgroup of mobile devices that include mobile devices within a predefined distance (or radius) of the specific location. In one embodiment, the server may form another subgroup of mobile devices that include mobile devices within another predefined distance of the specific location.

In one embodiment, the server may determine if the specific location is included in a database (e.g., database 430) included in the server to confirm that the specific location is associated with at least one mobile device in the subgroup of mobile devices. In one embodiment, the location data received from the first mobile device included in the group of mobile devices includes a location of the first mobile device and the proximity information received from the first mobile device includes an identification of mobile devices (e.g., some or all of mobile devices 203a-216a) that are within a predefined distance (or radius) of the location of the first mobile device.

At block 603, in response to receiving a request to send a notification (e.g., push notification) from the first mobile device, the server sends a prepopulated message as the notification to each mobile device in the subgroup(s) that is within the predefined distance of the specific location of the first mobile device. In doing so, for example, the server may send the notification (e.g., prepopulated message) to a notification service (e.g., OSPNS 304), with the notification service delivering the notification to each mobile device in the subgroup(s).

Figure 7:
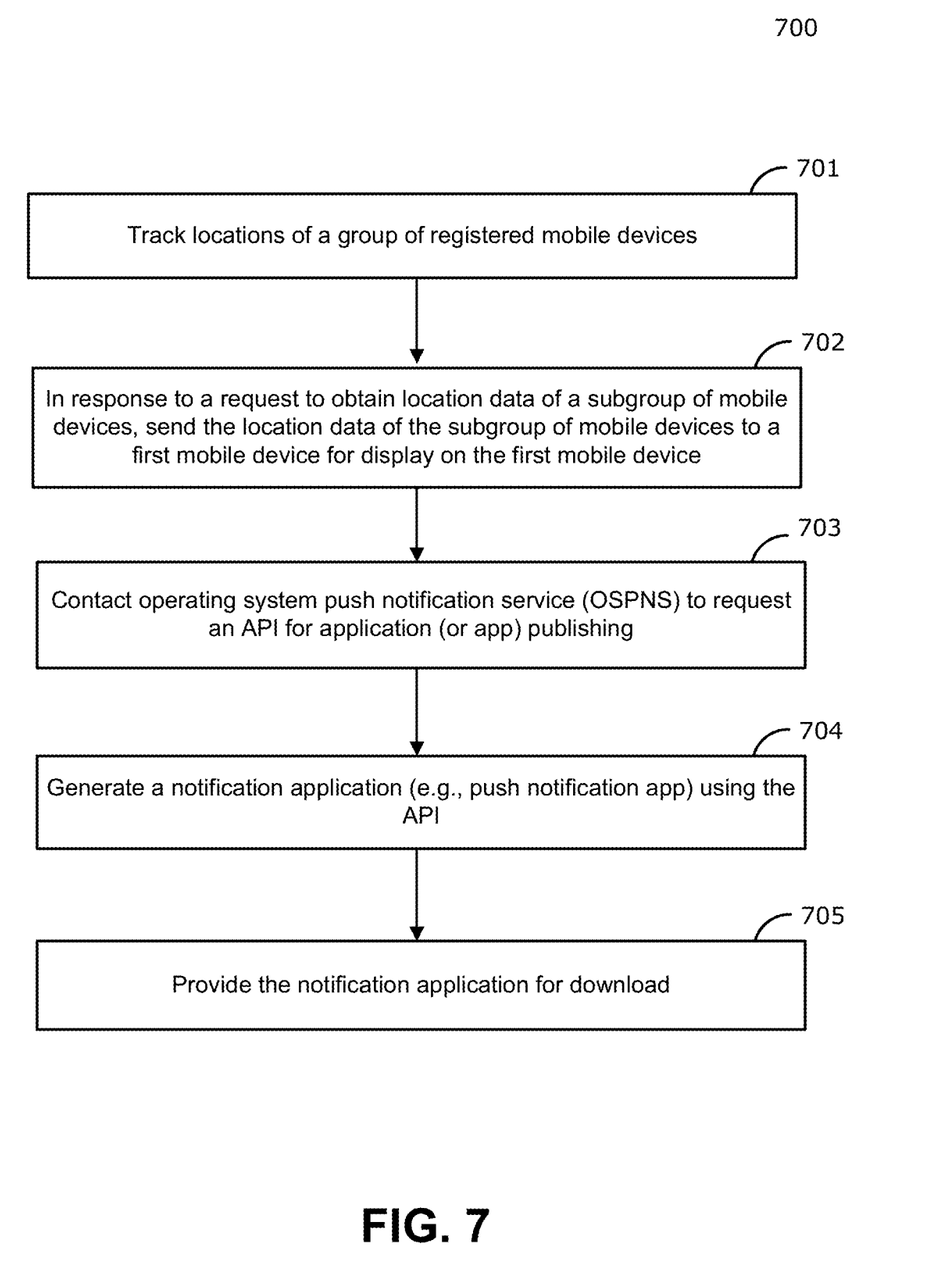
FIG. 7 is flow diagram illustrating a method of providing a notification application for download according to one embodiment.

FIG. 7 is flow diagram illustrating a method of providing a notification application for download according to one embodiment. Process 700 may be performed by processing logic which may include software, hardware, or a combination thereof. For example, process 700 may be performed by a server (e.g., server 303 of FIG. 3).

Referring to FIG. 7, at block 701, the server tracks the locations of a group of registered mobile devices (e.g., group 101). At block 702, in response to a request to obtain location data of a subgroup of mobile devices, the server may send the location data of the subgroup of mobile devices to a first mobile device (e.g., mobile device 201a) for display on the first mobile device, for example on a display device of the first mobile device. In one embodiment, the first mobile device may place limitations, such as within a predefined distance from the location of the first mobile device, for the display. At block 703, the server, as an application (or app) publisher, may contact an OSPNS (e.g., OSPNS 304) to request an API for application (or app) publishing. The server may receive the API from the OSPNS, where the API may enable the server to communicate with the OSPNS. At block 704, the server may generate a notification application (or app) using the API. For instance, the server may add programming instructions (or code) and generate a notification application (e.g., push notification application). In one embodiment, the notification application may enable the generation of push notifications for transmission and receipt among mobile devices. At block 705, the server provides the notification application for download. In doing so, the application may be made available for download from the server or a Web server, or through an app store by any mobile device in the group.

Figure 8:
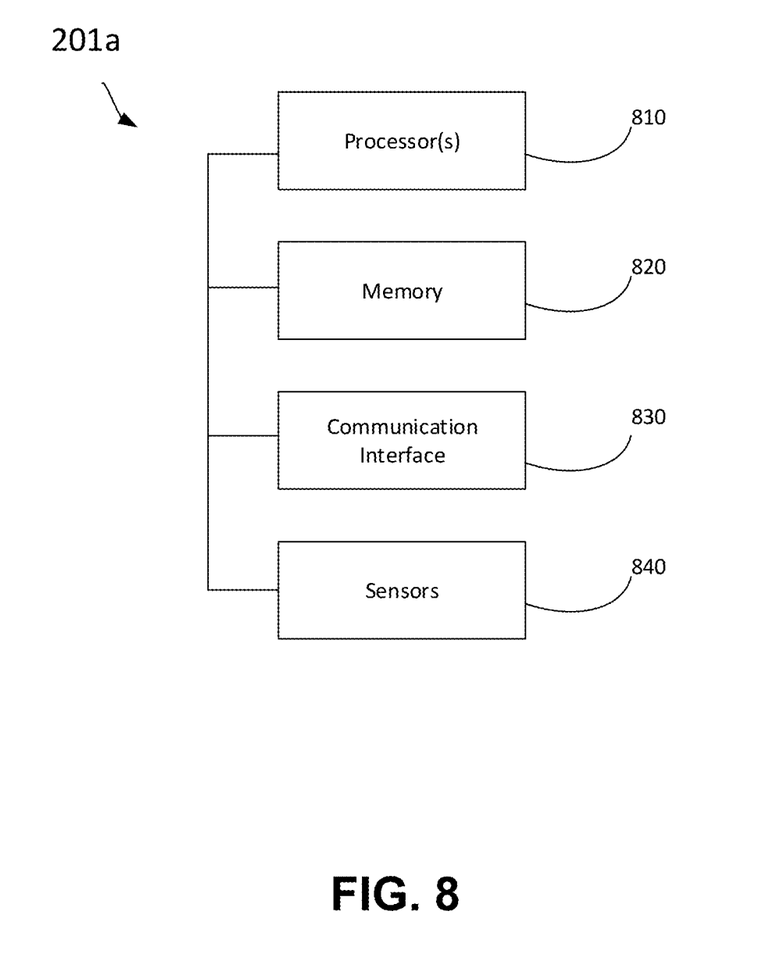
FIG. 8 illustrates a system for explaining example components of mobile devices illustrated in FIGS. 2 and 3 according to an embodiment.

FIG. 8 illustrates a system for explaining example components of mobile devices illustrated in FIGS. 2 and 3 according to an embodiment. The system, for example, may represent any mobile devices (e.g., mobile device 201a of FIG. 2 or mobile device 301 of FIG. 3).

Referring to FIG. 8, example components of mobile device 201a (as an example) include one or more processors 810, memory storage 820, communication interface 830 and sensors 840. The communication interface 830 may be a network communication interface such as a wired network interface (e.g., an IEEE 802.3 Ethernet interface), as well as a wireless interface (e.g., an IEEE 802.11 WiFi interface). Data may also be received from any one of a variety of different wireless communications networks and in accordance with any one of several different protocols. These include: a cellular mobile phone network (e.g. a GSM network), including current 2G, 3G, 4G, and LTE networks; and an IEEE 802.11 network (WiFi or WLAN). In one embodiment, the communication interface 830 may receive location information and related data from a number of mobile devices. The location information from each of the mobile devices may identify a location of each of the mobile devices, respectively. Connection information may also be received from each of the mobile devices to identify one of a number of connection sources as a preferred connection source used to identify the location of each of the mobile devices, respectively. For instance, the communication interface 830 may receive, from the mobile device, location information including the location of the mobile device and communication source information identifying cell towers.

The processor(s) 810 that is coupled to the communication interface 830 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 810 may be used to control the operations of the communication interface 830. For example, the processor 810 may be coupled to the communication interface 830 and executes software to control the wireless network communications functionality of the mobile device 201a (e.g. communicating with a network to transmit and receive data to other components of the system (e.g., servers) via the communication interface 830). In some cases, a particular function may be implemented as two or more pieces of software that are being executed by different hardware units of a processor.

In one embodiment, the processor(s) 810 is also coupled to the memory storage 820 that may include one or more different types of storage such as hard disk drive storage, nonvolatile memory, and volatile memory such as dynamic random access memory. The memory storage 820 may store a number of location information and a history of connection information for each location information received from mobile devices.

The memory storage 820 may also store instructions (e.g. software, firmware), which may be executed by the processor(s) 810. In one embodiment, when the instructions stored in memory storage 820 are executed by the processor(s) 810, the processor(s) 810 performs methods for delivering a prepopulated message to a subgroup of mobile devices. In some embodiments, the processor(s) 810 may receive the location information from the sensors 840, and store, in the memory storage 820, the location information. The processor(s) 810 may also control the functions of the communication interface 830 by signaling to the communication interface 830 to transmit notifications and other data the mobile devices.

The processor(s) 810, memory storage 820, communication interface 830, and the sensors 840 communicate to input devices and output devices via one or more communication links such as a bus. The communication links may also be other wired or wireless communication links.

Embodiments herein may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A computer-implemented method for delivering a prepopulated message to a subgroup of mobile devices, the method comprising:
    forming by a tracking server a group of members having at least one common criterion by registering and linking respective mobile devices of the group of members with the tracking server, the at least one common criterion comprising one or more member characteristics or an association among the members;
    forming by the tracking server a plurality of subgroups of members from the registered group of members, each subgroup being formed based on a respective subgroup criterion;
    tracking by the tracking server locations of the respective mobile devices of the registered group of members;
    determining by the tracking server a location of a first mobile device associated with a first member;
    identifying by the tracking server a first subgroup of mobile devices that are within a predefined radius of the location of the first mobile device, the first subgroup of mobile devices being associated with at least one of the plurality of subgroups of members;
    in response to receiving a request from the first mobile device to send a prepopulated message, sending by the tracking server the prepopulated message to each mobile device in the first subgroup of mobile devices, the prepopulated message being generated by the first mobile device based on contextual data selected by the first member and having information in the contextual data;
    creating a second subgroup of mobile devices that are within the predefined radius of the location of the first mobile device, wherein the second subgroup of mobile devices includes at least one common mobile device with the first subgroup of mobile devices and at least one mobile device excluded from the first subgroup of mobile devices;
    sending the prepopulated message to the at least one common mobile device with the second subgroup of mobile devices; and
    failing to send the prepopulated message to the at least one mobile device excluded from the first subgroup of mobile devices.

2. The method of claim 1, wherein identifying the first subgroup of mobile devices that are within the predefined radius of the location of the first mobile device comprises:
    searching and identifying the respective mobile devices of the group of members that are located within a proximity sensitivity radius from the location of the first mobile device, and
    selecting, from the identified mobile devices, the first subgroup of mobile devices based on a first subgroup criterion comprising a common characteristic or an association included in the contextual data.

3. The method of claim 1, wherein sending the prepopulated message to each mobile device in the first subgroup of mobile devices comprises: sending to the tracking server a request to transmit a push notification, wherein the push notification includes the prepopulated message.

4. The method of claim 1, wherein each of the first subgroup of mobile devices and the second subgroup of mobile devices is associated with one or more members having a common characteristic or association.

5. The method of claim 1, wherein the contextual data includes at least one of: an activity, an event, a point of interest (POI), a time of a meeting, or a location of the meeting.

6. The method of claim 1, wherein the predefined radius of the location of the first mobile device is selectable by the first member associated with the first mobile device.

7. The method of claim 1, wherein each of the first subgroup of mobile devices is configured to opt-in or opt-out of receiving the prepopulated message.

8. A non-transitory machine-readable medium having instructions stored therein, which when executed by a processor, cause the processor to perform operations, the operations comprising:
    registering and linking with a tracking server to track locations of a group of users having respective registered mobile devices, the group of users including a first user having a first registered mobile device;
    creating a plurality of subgroups of members from the group of registered users, each subgroup having one or more members having a common characteristic or association;
    creating a first subgroup of mobile devices that are within a predefined radius of a location of the first registered mobile device;
    creating a second subgroup of mobile devices that are within the predefined radius of the location of the first registered mobile device, wherein the second subgroup of mobile devices includes at least one common mobile device with the first subgroup of mobile devices and at least one mobile device excluded from the first subgroup of mobile devices;
    receiving contextual data that is selected by the first user of the first registered mobile device;
    prepopulating a message based on the received contextual data, wherein the prepopulated message includes information from the received contextual data; and
    sending the prepopulated message to each mobile device in the first subgroup of mobile devices including the at least one common mobile device with the second subgroup of mobile devices; and
    failing to send the prepopulated message to the at least one mobile device excluded from the first subgroup of mobile devices.

9. The non-transitory machine-readable medium of claim 8, wherein creating the first subgroup of mobile devices that are within the predefined radius of the location of the first registered mobile device comprises: searching the registered mobile devices and defining the first subgroup of mobile devices that are located within a proximity sensitivity radius from the location of the first registered mobile device based on a subgroup criterion.

10. The non-transitory machine-readable medium of claim 8, wherein sending the prepopulated message to each mobile device in the first subgroup of mobile devices comprises: sending to the tracking server a request to transmit a push notification, wherein the push notification includes the prepopulated message.

11. The non-transitory machine-readable medium of claim 8, wherein each of the first subgroup of mobile devices and the second subgroup of mobile devices is associated with one or more members having a common characteristic or association.

12. The non-transitory machine-readable medium of claim 8, wherein the predefined radius of the location of the first registered mobile device is selectable by the first user of the first registered mobile device.

13. The non-transitory machine-readable medium of claim 8, wherein the contextual data includes at least one of: an activity, an event, a point of interest (POI), a time of a meeting, or a location of the meeting.

14. The non-transitory machine-readable medium of claim 8, wherein the predefined radius of the location of the first registered mobile device is selectable by the first user of the first registered mobile device.

15. The non-transitory machine-readable medium of claim 8, wherein each of the first subgroup of mobile devices is configured to opt-in or opt-out of receiving the prepopulated message.

16. A mobile device, comprising:
a processor; and
a memory coupled to the processor to store instructions, which when executed by the processor, cause the processor to perform operations, the operations including
registering and linking with a tracking server to track locations of a group of users having respective registered mobile devices, the group of users including a first user having the mobile device as a first registered mobile device;
creating a plurality of subgroups of members from the group of registered users, each subgroup having one or more members having a common characteristic or association;
creating a first subgroup of mobile devices that are within a predefined radius of a location of the mobile device;
creating a second subgroup of mobile devices that are within the predefined radius of the location of the mobile device, wherein the second subgroup of mobile devices includes at least one common mobile device with the first subgroup of mobile devices and at least one mobile device excluded from the first subgroup of mobile devices;
receiving contextual data that is selected by a user of the mobile device;
prepopulating a message based on the received contextual data, wherein the prepopulated message includes at least a context from the received contextual data;
sending the prepopulated message to each mobile device in the first subgroup of mobile devices including the at least one common mobile device with the second subgroup of mobile devices; and
failing to send the prepopulated message to the at least one mobile device excluded from the first subgroup of mobile devices.

17. The mobile device of claim 16, wherein creating the first subgroup of mobile devices comprises: searching and defining a subgroup of mobile devices that are located within a proximity sensitivity radius from the location of the mobile device based on a subgroup criterion.

18. The mobile device of claim 16, wherein each of the first subgroup of mobile devices and the second subgroup of mobile devices is associated with one or more members having a common characteristic or association.

19. The mobile device of claim 16, wherein the predefined radius of the location of the mobile device is selectable by the first user of the mobile device.

\* \* \* \* \*